US007258316B2

(12) United States Patent
Reeves

(10) Patent No.: US 7,258,316 B2
(45) Date of Patent: Aug. 21, 2007

(54) EXPANSIBLE HOLE ANCHOR WITH ENLARGED CHOCK-RELEASING STRIKER HEAD

(76) Inventor: Eric W. Reeves, 8701 Mallard Creek Rd., Charlotte, NC (US) 28262

( * ) Notice: Subject to any disclaimer, the term of this patent is extended or adjusted under 35 U.S.C. 154(b) by 0 days.

(21) Appl. No.: 11/069,646

(22) Filed: Mar. 1, 2005

(65) Prior Publication Data

US 2006/0022101 A1 Feb. 2, 2006

Related U.S. Application Data

(63) Continuation of application No. PCT/US2004/024129, filed on Jul. 27, 2004.

(51) Int. Cl.
*A47F 5/08* (2006.01)
*F16B 13/04* (2006.01)

(52) U.S. Cl. ................. 248/231.91; 248/239; 248/925; 411/75

(58) Field of Classification Search ........... 248/231.91, 248/239, 925; 411/44, 80, 75, 15, 79
See application file for complete search history.

(56) References Cited

U.S. PATENT DOCUMENTS

| | | | |
|---|---|---|---|
| 3,478,641 | A | 11/1969 | Dohmeier |
| 3,903,785 | A | 9/1975 | Pepper, Jr. |
| 3,957,237 | A | 5/1976 | Campbell |
| 4,082,241 | A | 4/1978 | Burkey |
| 4,184,657 | A | 1/1980 | Jardine |
| 4,422,607 | A | 12/1983 | Vallance |
| 4,464,076 | A | 8/1984 | Leibhard |
| 4,506,924 | A | 3/1985 | Nieder |
| 4,572,464 | A | 2/1986 | Phillips |
| 4,575,032 | A | 3/1986 | Taylor |
| 4,607,992 | A | 8/1986 | Mauritz et al. |
| 4,611,963 | A | 9/1986 | Frohlich et al. |
| 4,643,377 | A | 2/1987 | Christianson |
| 4,643,378 | A | 2/1987 | Guthrie et al. |
| 4,715,568 | A | 12/1987 | Best, Jr. |

(Continued)

FOREIGN PATENT DOCUMENTS

WO WO 2005/012650 * 2/2005

*Primary Examiner*—Carl D. Friedman
*Assistant Examiner*—Tan Le
(74) *Attorney, Agent, or Firm*—Clements Walker; Jason S. Miller

(57) ABSTRACT

An expansible anchor is adapted for inserting into a hole formed with a structure. The anchor includes a load cable and a first chock attached to an end of the load cable. A second chock resides adjacent to the first chock, and is adapted for movement between an anchor-contracting position and an anchor-expanding position. In the anchor-contracting position, the anchor is readily inserted into and removed from the hole of the structure. In the anchor-expanding position, the anchor is locked inside the hole of the structure. A chock-release column bears against at least one of the first and second chocks and has an enlarged head adapted for locating outside of the hole. The enlarged head defines a striking surface adapted for receiving a sudden force. This force is transferred through the chock-release column to the first or second chocks, such that the second chock is movable from the anchor-expanding position to the anchor-contracting position to thereby dislodge the anchor from the hole of the structure.

13 Claims, 9 Drawing Sheets

U.S. PATENT DOCUMENTS

| | | | | |
|---|---|---|---|---|
| 4,818,163 | A | 4/1989 | Bereiter et al. | |
| 4,834,327 | A | 5/1989 | Byrne | |
| 4,869,342 | A | 9/1989 | Borst | |
| 5,042,888 | A | 8/1991 | Shinjo | |
| 5,253,964 | A | 10/1993 | Swemmer | |
| 5,344,252 | A | 9/1994 | Kakimoto | |
| 5,484,132 | A | 1/1996 | George et al. | |
| 6,092,773 | A * | 7/2000 | Kieliszewski | 248/231.9 |
| 6,109,578 | A | 8/2000 | Guthrie et al. | |
| 6,283,426 | B1 * | 9/2001 | Guthrie et al. | 248/231.9 |
| 6,729,821 | B2 | 5/2004 | Guthrie et al. | |
| 7,011,281 | B2 | 3/2006 | Guthrie et al. | |
| 2006/0022101 | A1 * | 2/2006 | Reeves | 248/231.91 |

* cited by examiner

EXPANSIBLE HOLE ANCHOR WITH ENLARGED CHOCK-RELEASING STRIKER HEAD

TECHNICAL FIELD AND BACKGROUND OF THE INVENTION

This invention relates to an expansible hole anchor with an enlarged chock-releasing striker head. The invention is easily installed and removed from a hole formed with a solid structure. In one application, the present anchor is inserted into a hole drilled in a concrete wall at a construction site. A safety harness, lifeline, and other fall protection gear is secured to the worker and to the anchor to arrest the worker in the event of a fall. In another application, the present anchor is applicable for use in recreational rock climbing.

Substantial drawbacks and limitations exist in prior art expansible hole anchors, particularly those with spring-loaded retractable handles. The handle is applicable for moving the anchor from a normal expanded condition to a contracted condition for inserting and removing the anchor from the hole. In order to remove the anchor, the user is instructed to manually retract the handle to disengage the anchor chocks from an inside wall of the hole. In many cases, the anchor is so tightly lodged inside the hole that movement of the handle is difficult, if not impossible. This occurs often, as the operating instructions call for a tug on the load cable to set the anchor during insertion. Additional forces exerted on the anchor during a worker's fall cause even greater locking engagement of the anchor chocks. The instructions commonly provided for dislodging an embedded anchor are to insert a small, narrow flat screwdriver into the hole, and create an impact force on an end fitting to overcome the locking friction. In practice, this procedure is generally ineffective; often resulting in mangled or broken retraction cables, and rendering the anchor unsuitable for future use. This procedure further inconveniences the user by requiring the availability of special tools in order to access and release the anchor chocks. If all methods of removal fail, the exposed portion of the anchor is torched off, a new hole drilled, and the balance of the anchor is left in the old hole.

A further problem of commercial prior art anchors relates to the exposure of control cables operable for moving the anchor from the expanded condition to the contracted condition. Typically, these cables will bear directly against an inside wall of the anchor hole, resulting in substantial abrasion and chaffing when the anchor is inserted into and removed from the hole. Further wear is created when the worker moves about causing the control cables to grind against the concrete lip of the hole. If left undetected, the worn cables will eventually cause the anchor to fail which may result in serious injury or death.

SUMMARY OF INVENTION

Therefore, it is an object of the invention to provide an expansible hole anchor which is readily inserted into and removed from a hole formed in a solid structure.

It is another object of the invention to provide an expansible hole anchor which is conveniently dislodged and removed without requiring insertion of a special tool inside the hole.

It is another object of the invention to provide an expansible hole anchor which enables substantial retraction of the chocks, thereby increasing contraction of the anchor relative to the hole.

It is another object of the invention to provide an expansible hole anchor which is applicable for use in holes of varying depths.

It is another object of the invention to provide an expansible hole anchor which offers a striking surface outside of the hole for dislodging the anchor chocks.

These and other objects of the present invention are achieved in the preferred embodiments disclosed below by providing an expansible anchor adapted for inserting into a hole formed with a structure. The anchor includes a load cable and a first chock attached to an end of the load cable. A second chock resides adjacent to the first chock, and is adapted for movement between an anchor-contracting position and an anchor-expanding position. In the anchor-contracting position, the anchor is readily inserted into and removed from the hole of the structure. In the anchor-expanding position, the anchor is locked inside the hole of the structure. A chock-release column bears against at least one of the first and second chocks and has an enlarged head adapted for locating outside of the hole. The enlarged head defines a striking surface adapted for receiving a sudden force. This force is transferred through the chock-release column to the first or second chocks, such that the second chock is movable from the anchor-expanding position to the anchor-contracting position to thereby dislodge the anchor from the hole of the structure.

According to another preferred embodiment of the invention, a handle is carried by the load cable and adapted for moving the second chock from the anchor-expanding position to the anchor-contracting position.

According to another preferred embodiment of the invention, a chock cable interconnects the handle and the second chock.

According to another preferred embodiment of the invention, the handle includes a rocker assembly which allows kink-controlling movement of the chock cable relative to the load cable.

According to another preferred embodiment of the invention, the chock-release column includes a cable guide defining respective openings receiving the load cable and the chock cable.

According to another preferred embodiment of the invention, the chock-release column includes a series of axially-aligned spools carried on the load cable. The spools define respective break points allowing said anchor to flex relative to the structure.

According to another preferred embodiment of the invention, a compression spring is carried on the load cable and adapted for normally urging the spools into an assembled arrangement.

According to another preferred embodiment of the invention, a chafe protective/cable guide sheath is located between the load cable and the spring.

According to another preferred embodiment of the invention, a cable-positioning ferrule defines respective spaced-apart openings for receiving the load cable and the chock cable.

According to another preferred embodiment of the invention, the second chock defines a generally convex inner surface adapted for sliding movement against an inner surface of the first chock.

According to another preferred embodiment of the invention, the first chock has a bearing shoulder against which the chock-release column is forced.

According to another preferred embodiment of the invention, the first chock further includes an integrally-formed cable connector secured to the load cable and extending through a hollow end of the chock-release column.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
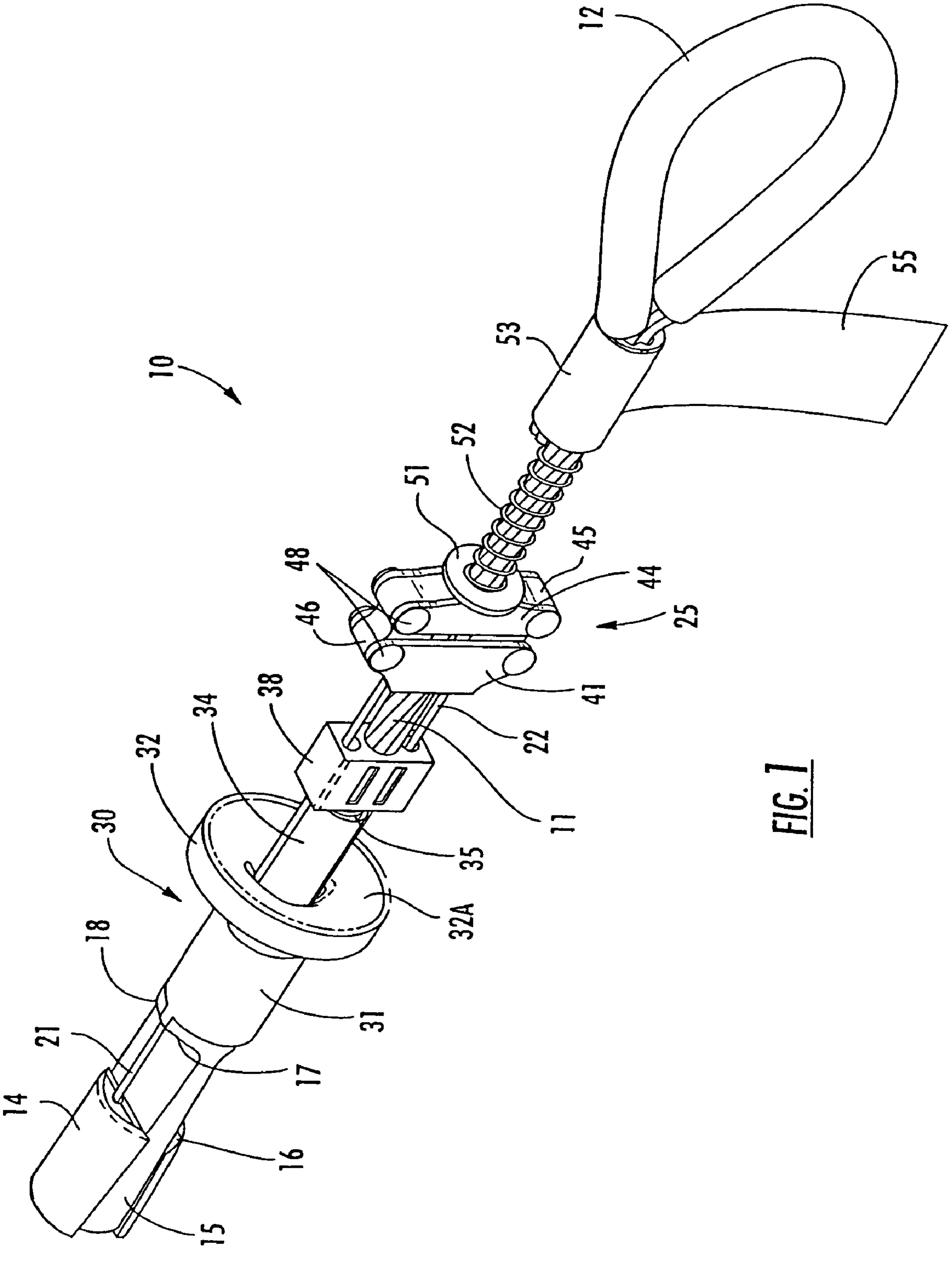
FIG. 1 is a perspective view of an expansible hole anchor according to one preferred embodiment of the present invention.

Referring now specifically to the drawings, an expansible hole anchor according to the present invention is illustrated in FIG. 1, and shown generally at reference numeral 10. The hole anchor 10 is adapted for inserting into a hole formed with a solid structure, such as a concrete wall, and is applicable for use with a safety harness, lifeline, and other fall protection gear worn by a worker to arrest the worker in the event of a fall. The anchor 10 comprises a steel-wire load cable 11 looped at one end 12 for attaching the lifeline, and an assembly of solid metal chocks 14, 15, and 16 located at an opposite end. The chocks 14, 15, and 16 cooperate, as described below, to constrict and expand the anchor 10 relative to the hole of the structure.

Figure 2:
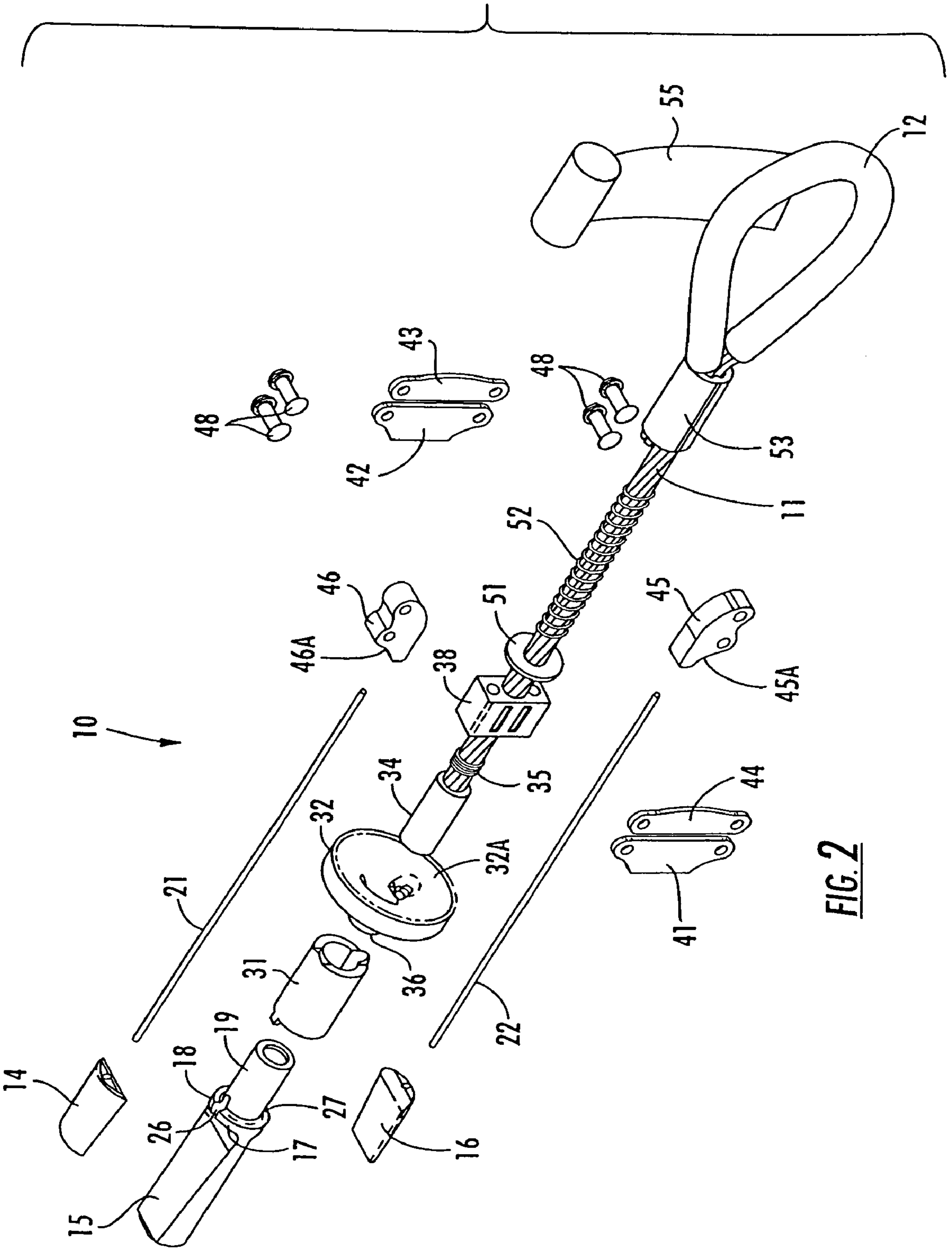
FIG. 2 is an exploded view of the hole anchor.

As best shown in FIGS. 1 and 2, the center chock 15 has a generally wedge-shaped body, arcuate shoulders 17 and 18, and an integrally-formed rearward extending cable connector 19. The cable connector 19 attaches the center chock 15 directly to the load cable 11. The side chocks 14 and 16 reside adjacent the center chock 15, and have complementary angled profiles designed to provide maximum uniform gripping action when set inside the structure hole. The outside surface of each side chock 14 and 16 is preferably curved to conform to an inside wall of the structure hole, while the inside surface is substantially flat for sliding along a flat outside surface of the center chock 15. In an alternative embodiment, the inside surface of each side chock is slightly convex, while the outside surfaces of the center chock are either flat or slightly concave.

The side chocks 14 and 16 are attached to respective steel-wire chock cables 21 and 22. The chock cables 21, 22 extend rearward to a spring-loaded pivot handle 25. The pivot handle 25 is carried on the load cable 11, and is adapted for being manually retracted by the user to move the side chocks 14, 16 from a normal anchor-expanding position, best shown in FIGS. 1 and 3, to an anchor-contracting position shown in FIG. 4. In the anchor-contracting position, the side chocks 14, 16 are more closely spaced apart on opposite sides of the center chock 15 and immediately forward of the arcuate shoulders 17 and 18, such that the anchor 10 is readily inserted into and removed from the hole of the structure. The spaces 26 and 27 formed between the shoulders 17 and 18 allow passage of the chock cables 21, 22 rearwardly towards the handle 25. The rear portion of the center chock 15 is relatively thin, thereby allowing substantial contraction of the anchor 10. Preferably, the thinnest section of the center chock 15 forward of the arcuate shoulders 17, 18 has a profile dimension less than the diameter of the load cable 11 (See FIGS. 3 and 4). In the anchor-expanding position, the side chocks 14, 16 are urged forward along diverging outer surfaces of the center chock 15. In use, the anchor 10 does not fully expand inside the hole, but instead forces the side chocks 14, 16 into sufficient frictional engagement with the inside wall of the structure hole to prevent inadvertent dislodging of the anchor 10. After inserting the anchor 10 into the hole, the side chocks 14, 16 are set by one controlled pull on the cable loop 12.

Referring again to FIGS. 1 and 2, a chock-release column 30 is carried on the load cable 11 adjacent the center chock 15, and comprises a separate cable cylinder 31 and enlarged-diameter head 32. The cable cylinder 31 is positioned over the cable connector 19 of the center chock 15 and bears directly against the arcuate shoulders 17, 18. The enlarged head 32 locates outside of the structure hole, and defines a flat annular striking or bearing surface 32A designed to receive a force applied using the thumbs or any rigid object, such as a snap hook. The force is transferred directly through the chock-release column 30 to the center chock 15 to dislodge the side chocks 14, 16 from friction-locking engagement inside the hole. Once dislodged, the side chocks 14, 16 are easily retracted by the handle 25; moving from the anchor-expanding position to the anchor-contracting position to remove the anchor 10 from the structure hole. A cylindrical spacer 34 and coil spring 35 are carried on the load cable 11 rearward of the chock-release column 30, and cooperate to maintain the cable cylinder 31 and enlarged striking head 32 in an engaged, assembled condition with the cable cylinder 31 bearing directly against the shoulders 17, 18 of the center chock 15.

Preferably, the maximum diameter of the striking head 32 is greater than the maximum distance between the side chocks 14 and 16 in the anchor-expanding condition. As such, upon insertion of the anchor 10 into the hole, the enlarged striking head 32 is pushed directly against the mouth of the hole, thereby locating the anchor chocks 14, 15, and 16 inside the hole in a position of maximum effectiveness and safety, while maintaining ready access to the exposed striking surface 32A. When the cable loop 12 is pulled vertically by the weight of the worker, the chock-release column 30 flexes slightly at a joint between the cable cylinder 31 and the enlarged head 32. The outer flange of the head 32 engages the structure outside of the hole to help distribute forces acting on the load cable 11 and the structure.

According to one embodiment, the enlarged head 32 of the chock-release column 30 has three openings for receiving the load cable 11 and chock cables 21, 22, respectively. Preferably, the center opening has a radiused edge to minimize wear on the load cable 11 when pulled vertically. A reduced diameter, integral neck 36 extends forward of the enlarged head 32 has interior passages or longitudinal exterior grooves to designed receive the chock cables 21, 22. The neck 36 cooperates with the arcuate shoulders 17, 18 to further position the side chocks 14, 16 relative to the center chock 15. The chock cables 21, 22 extend from the side chocks 14, 16, and are directed along a length of the anchor 10 by a fixed positioning block 38 located adjacent the pivot handle 25. The positioning block 38 likewise has three openings for receiving the load cable 11 and chock cables 21, 22, respectively. In order to limit twisting of the anchor 10, rotation of the chock-release column 30 relative to the center chock 15 is prevented by mating notches and fingers.

Figure 3:
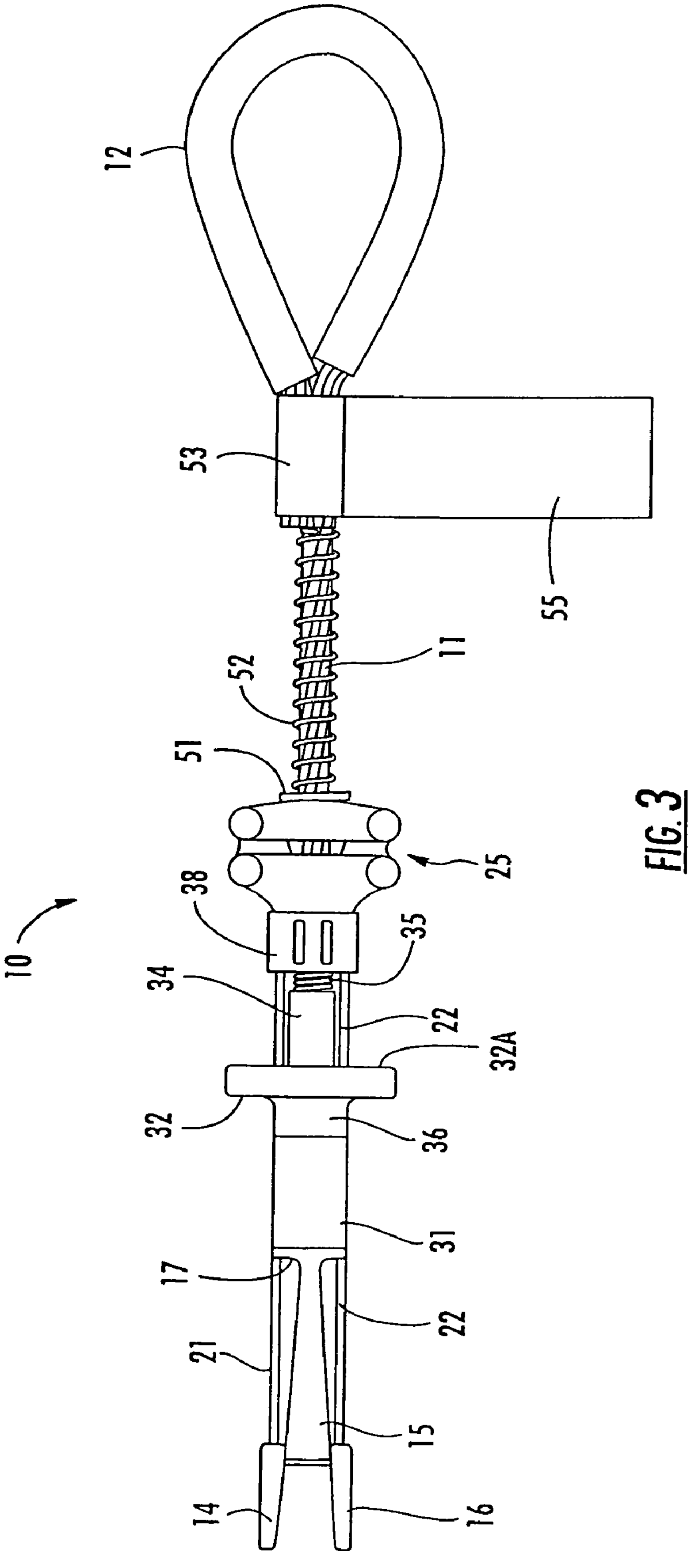
FIG. 3 is a side view of the hole anchor with the side chocks in an anchor-expanding position.
Figure 4:
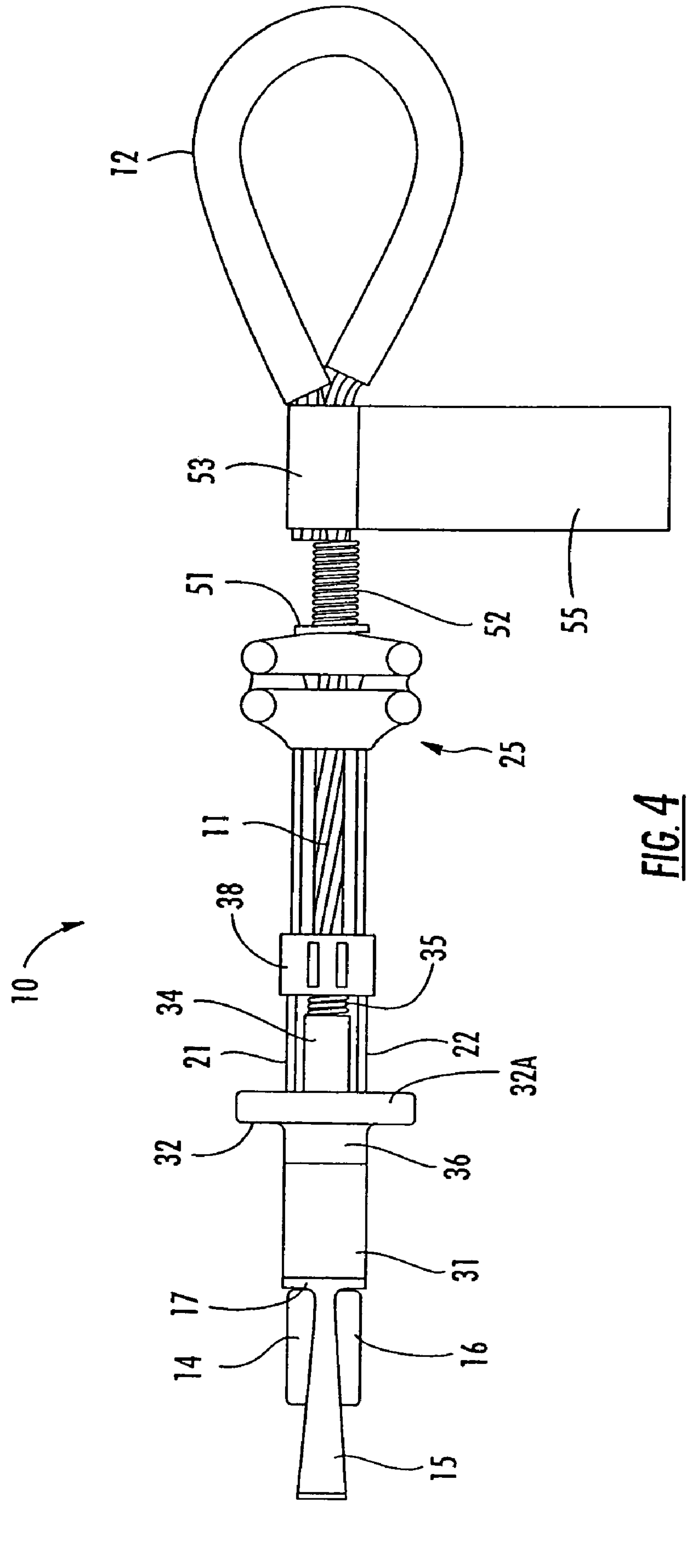
FIG. 4 is a side view of the hole anchor with the side chocks in an anchor-contracting position.

The pivot handle 25 comprises an assembly of links 41, 42, 43, 44 and rockers 45, 46 (See FIG. 2) attached together on opposite sides of the load cable 11 by rivets 48. Respective ends of the chock cables 21, 22 are fixed to the rockers 45, 46. When assembled, as shown in FIGS. 1, 3, and 4, the rockers 45, 46 cooperate to allow kink-controlling movement of the chock cables 21, 22 relative to the load cable 11. The handle 25 rocks or pivots when one chock cable 21, 22 is in tension and the other cable 21, 22 is in compression, thereby discouraging cable kinking or excessive bending which may foul effective operation of the anchor 10. Preferably, to facilitate retraction of the handle 25, respective finger curves 45A and 46A are formed with the rockers 45, 46.

A washer 51 and retractor spring 52 are carried on the load cable 11 rearward of the pivot handle 25. The retractor spring 52 is compressed between the handle 25 and cable loop 12, and operates to normally urge the handle 25 and chock cables 21, 22 forward thereby biasing the side chocks 14 and 16 in the anchor-expanding position. The retractor spring 52 is preferably pre-loaded in the anchor-expanding position at greater than 20% of its maximum compression force. Preferably, the cable loop 12 is secured by a duplex ferrule 53 and reinforced with a metal thimble (not shown). An equipment tag 55 provides relevant product information.

A further embodiment of an expansible hole anchor 60 according to the present invention is illustrated in FIGS. 5-9. The anchor 60 comprises a steel-wire load cable 61 looped at one end 62, and an assembly of solid metal chocks 64, 65, and 66 located at an opposite end. The chocks 64, 65, 66 cooperate, as previously described, to constrict and expand the anchor 60 relative to the hole of the structure.

Figure 5:
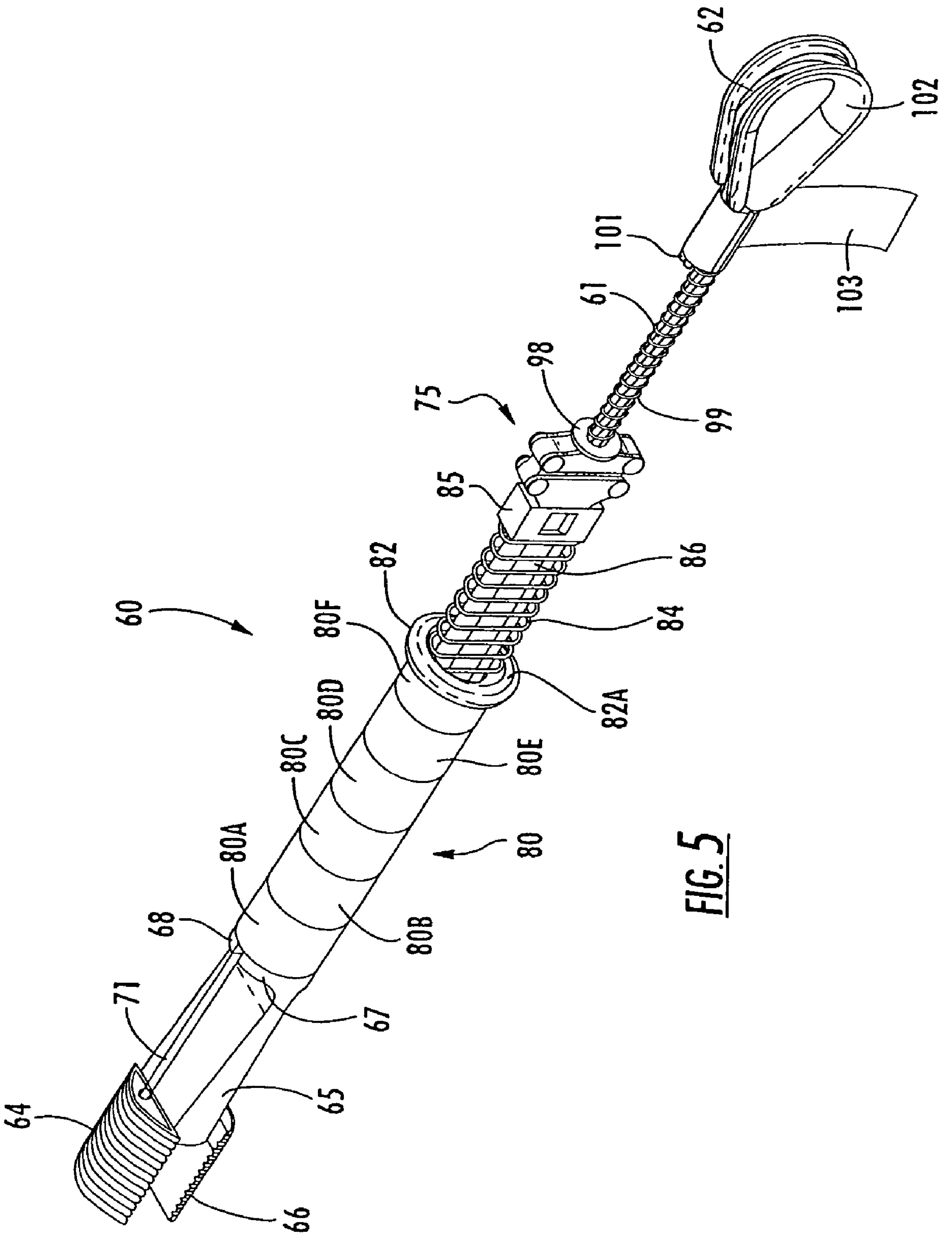
FIG. 5 is a perspective view of an expansible, variable-depth hole anchor according to a second preferred embodiment of the invention.
Figure 6:
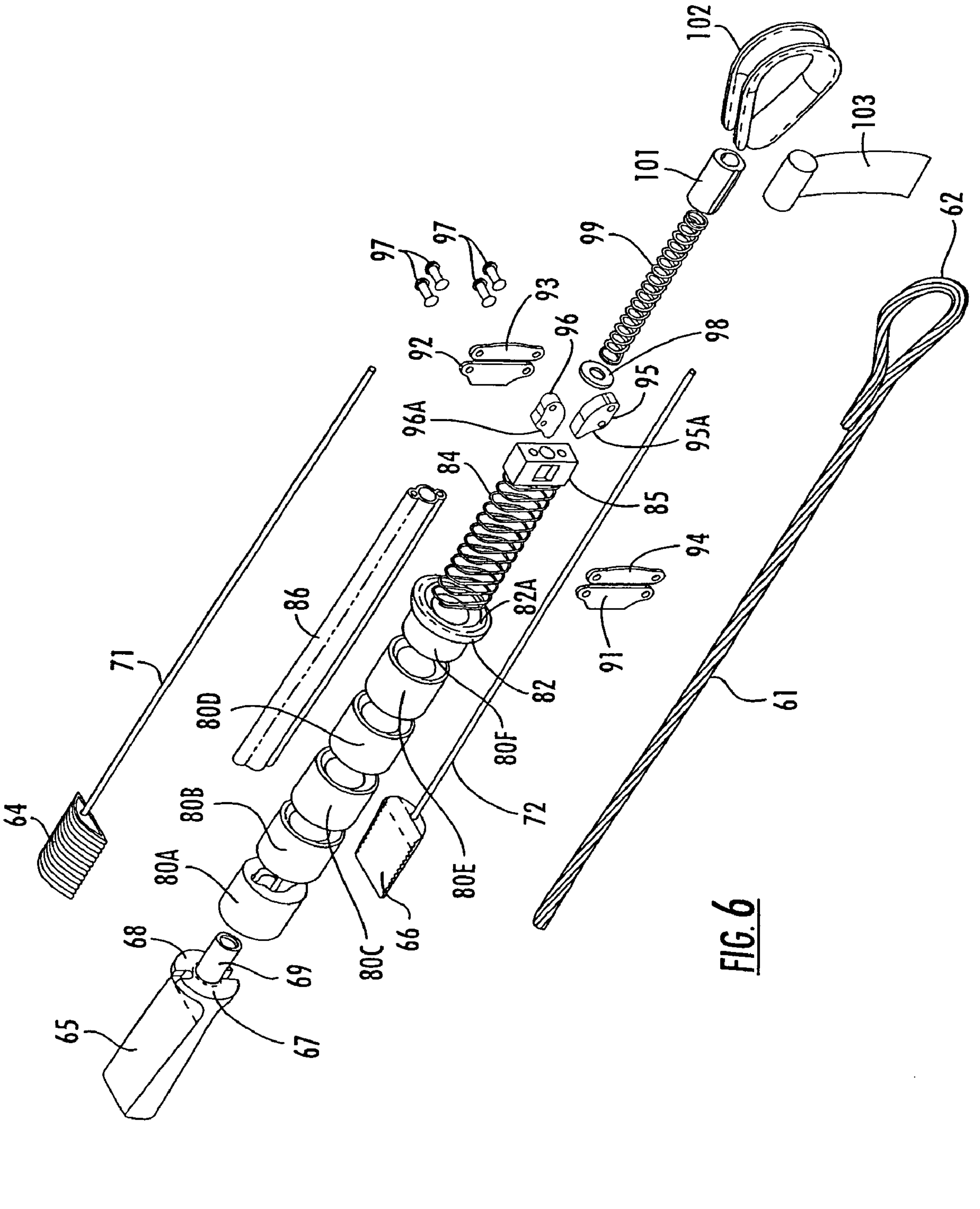
FIG. 6 is an exploded view of the variable-depth hole anchor.

As best shown in FIGS. 5 and 6, the center chock 65 has a generally wedge-shaped body, arcuate shoulders 67 and 68, and an integrally-formed rearward extending cable connector 69. The cable connector 69 attaches the center chock 65 directly to the load cable 61. The side chocks 64 and 66 reside adjacent the center chock 65, and have complementary angled profiles designed to provide maximum uniform gripping action when set inside the structure hole. The outside surface of each side chock 64, 66 is preferably curved to conform to an inside wall of the hole, while the inside surface is substantially flat or convex for sliding along a flat outside surface of the center chock 65. In addition, the outside surfaces of the side chocks 64, 66 may have lateral ridges or other surface texturing for increased friction resistance.

The side chocks 64, 66 are attached to respective steel-wire chock cables 71 and 72. The chock cables 71, 72 extend rearward to a spring-loaded pivot handle 75. The pivot handle 75 is carried on the load cable 61, and is adapted for being manually retracted by the user to move the side chocks 64, 66 from a normal anchor-expanding position, best shown in FIGS. 5 and 7, to an anchor-contracting position shown in FIG. 8. In the anchor-contracting position, the side chocks 64, 66 are more closely spaced apart on opposite sides of the center chock 65 such that the anchor 60 is readily inserted into and removed from the hole of the structure. The rear portion of the center chock 65 is relatively thin, thereby allowing substantial contraction of the anchor 60. Preferably, the thinnest section of the center chock 65 has a profile dimension less than the diameter of the load cable 61 (See FIGS. 7 and 8). In the anchor-expanding position, the side chocks 64, 66 are urged forward along diverging outer surfaces of the center chock 65.

Referring again to FIGS. 5 and 6, a chock-release column 80 is carried on the load cable 61 adjacent the center chock 65, and comprises a series of individual, aligned column spools 80A, 80B, 80C, 80D, 80E, and 80F. The forwardmost spool 80A defines a contoured opening for receiving and guiding the load cable 61 and chock cables 71, 72. This cable guide spool 80A positions over the cable connector 69 of the center chock 65 and bears directly against the arcuate shoulders 67, 68. The rearwardmost spool 80F has an enlarged-diameter head 82 which locates outside of the structure hole, and defines a flat annular striking (bearing) surface 82A designed to receive a force applied using the thumbs or any rigid object. The force is transferred directly through the assembled spools 80A-80F to the center chock 65 to dislodge the side chocks 64, 66 from friction-locking engagement inside the hole. Once dislodged, the side chocks 64, 66 are easily retracted by the handle 75; moving from the anchor-expanding position to the anchor-contracting position to remove the anchor 60 from the structure hole.

The chock-release column 80 is normally urged into an axially-aligned, assembled condition by a compression spring 84 carried on the load cable 61. The compression spring 84 extends between the end spool 80F and a fixed positioning block 85. A flexible, polyurethane, cable guide sheath 86 resides between the spring 84 and the cables 61, 71, and 72, and extends forward through each of the column spools 80A-80F to protect the cables 61, 71, and 72 against abrasion, chafing and other wear. The sheath 86 has separate openings for receiving and guiding the load cable 61 and chock cables 71 and 72, respectively. The chock cables 71, 72 extend rearward from the sheath 86 through openings formed with the fixed positioning block 85 to the pivot handle 75.

Figure 9:
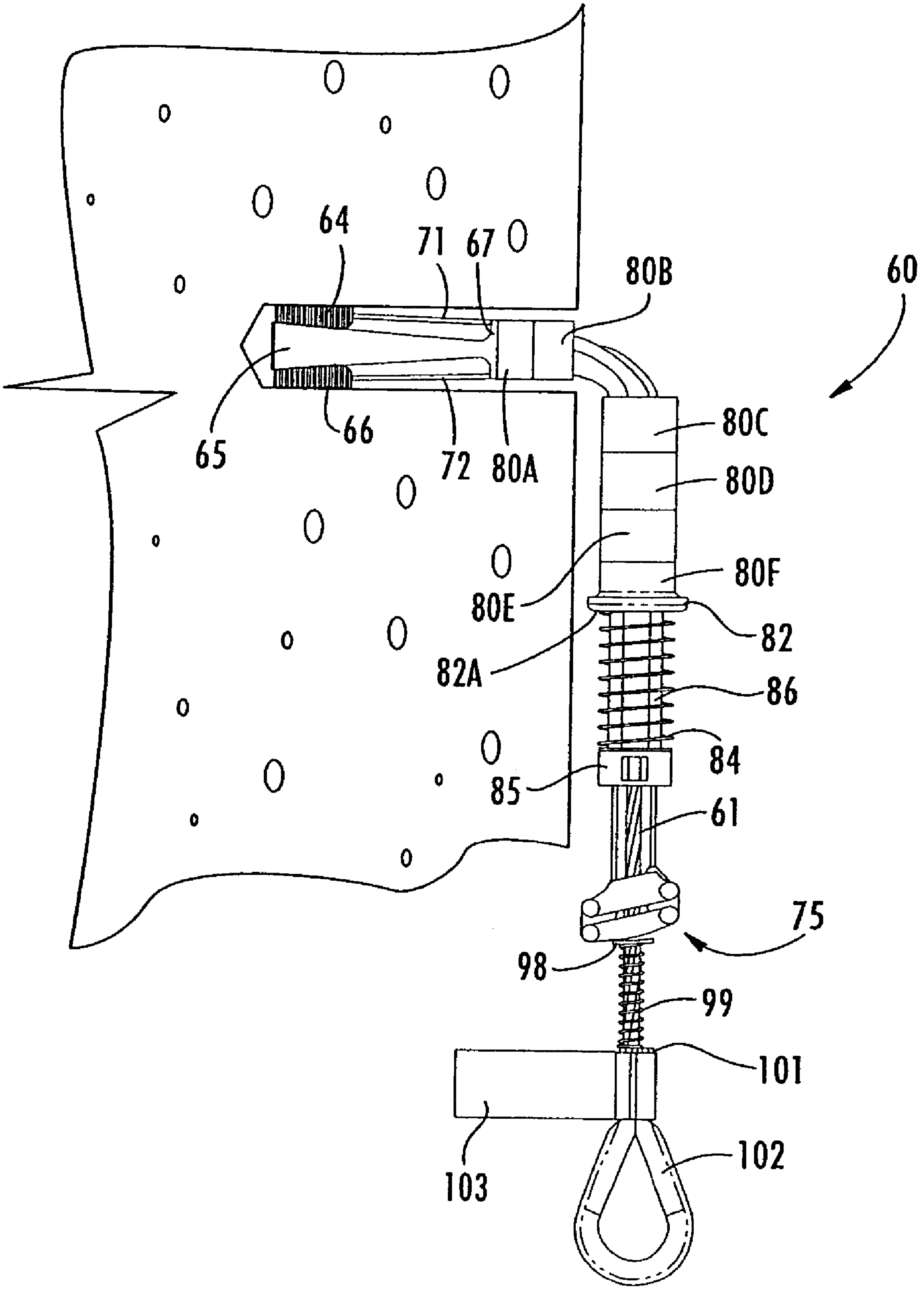
FIG. 9 is an environmental view of the variable-depth hole anchor positioned inside a hole formed in a solid structure.

The unique multi-piece construction of the chock-release column 80 allows use of the present anchor 60 in holes of varying depths. As illustrated in FIG. 9, when inserted into a relatively shallow hole and upon application a vertical load to the cable loop 62, the anchor 60 flexes as much as 90 degrees or more at a break point between spools 80B and 80C. The relatively long compression spring 84 accommodates sliding adjustment of the spools 80A-80F along the length of the anchor 60. To remove the anchor 60 from the hole, the load cable 61 may be straightened to reassemble and align the spools 80A-80F, and the enlarged-diameter head 82 struck using a suitable rigid object, as previously described. Alternatively, with the load cable 61 bent as shown in FIG. 9, the exposed spool 80B located at the mouth of the hole can be struck to transmit a chock-releasing force directly to the center chock 65.

Figure 7:
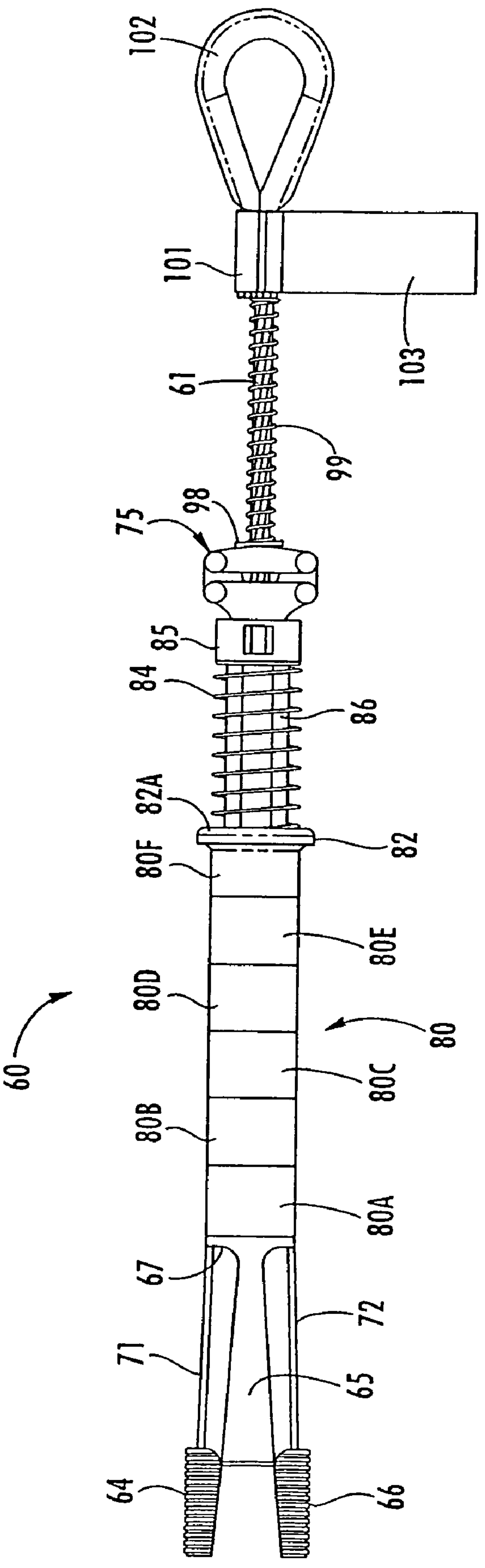
FIG. 7 is a side view of the variable-depth hole anchor with the side chocks in an anchor-expanding position.
Figure 8:
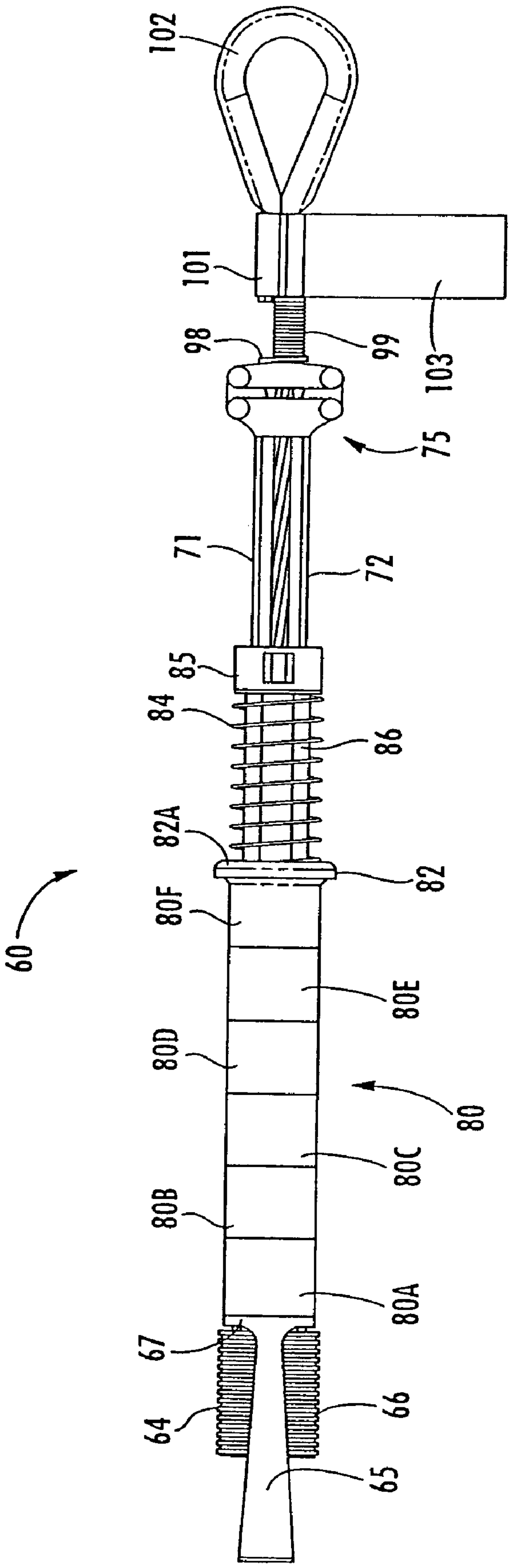
FIG. 8 is a side view of the hole anchor with the side chocks in an anchor-contracting position.

As described above, the pivot handle 75 comprises an assembly of links 91, 92, 93, 94 and rockers 95, 96 (See FIG. 6) attached together on opposite sides of the load cable 61 by rivets 97. Respective ends of the chock cables 71, 72 are fixed to the rockers 95, 96. When assembled, as shown in FIGS. 5, 7, and 8, the rockers 95, 96 cooperate to allow kink-controlling movement of the chock cables 71, 72 relative to the load cable 61. The handle 75 rocks or pivots, as indicated in FIG. 9, when one chock cable 71 is in tension and the other cable 72 is in compression, thereby discouraging cable kinking or excessive cable bending which may damage the anchor 60. Preferably, to facilitate retraction of the handle 75, respective finger curves 95A and 96A are formed with the rockers 95 and 96.

A washer 98 and retractor spring 99 are carried on the load cable 61 rearward of the pivot handle 75. The retractor spring 99 is compressed between the handle 75 and cable loop 62, and operates to normally urge the handle 75 and chock cables 71, 72 forward thereby biasing the side chocks 64, 66 in the anchor-expanding position. Preferably, the cable loop 62 is secured by a duplex ferrule 101 and reinforced by a metal thimble 102. An equipment tag 103 provides relevant product information.

Embodiments of an expansible hole anchor according to the present invention are described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. An expansible anchor adapted for inserting into a hole formed with a structure, said anchor comprising:

a load cable;

a center chock attached to an end of said load cable, and comprising a bearing shoulder and an integrally-formed cable connector secured to said load cable;

at least one side chock adjacent to said center chock and adapted for movement between an anchor-contracting position and an anchor-expanding position, whereby in said anchor-contracting position, said anchor is readily inserted into and removed from the hole of the structure, and in said anchor-expanding position, said anchor is locked inside the hole of the structure;

a chock-release column having a hollow end receiving the cable connector of said center chock and bearing against the bearing shoulder of said center chock, and said chock-release column further comprising an enlarged head adapted for locating outside of the hole, said enlarged head defining a striking surface adapted for receiving a sudden force and transferring the force through said chock-release column to said center chock, such that said at least one side chock is movable from the anchor-expanding position to the anchor-contracting position to thereby dislodge said anchor from the hole of the structure; and a handle carried by said load cable and adapted for moving said second at least one side chock from the anchor-expanding position to the anchor-contracting position.

2. An expansible anchor according to claim 1, and comprising a chock cable interconnecting said handle and said at least one side chock.

3. An expansible anchor according to claim 2, wherein said handle comprises a rocker assembly allowing kink-controlling movement of said chock cable relative to said load cable.

4. An expansible anchor according to claim 1, wherein said chock-release column comprises a cable guide defining a contoured opening receiving said load cable and said chock cable.

5. An expansible anchor according to claim 2, and comprising a cable-positioning ferrule defining respective spaced-apart openings for receiving said load cable and said chock cable.

6. An expansible anchor according to claim 1, wherein said at least one side chock defines a generally convex inner surface adapted for sliding movement against an inner surface of said center chock.

7. An expansible anchor adapted for inserting into a hole formed with a structure, said anchor comprising:

a load cable;

a first chock attached to an end of said load cable;

a second chock adjacent to said first chock and adapted for sliding linear movement between an anchor-contracting position and an anchor-expanding position, whereby in said anchor-contracting position, said anchor is readily inserted into and removed from the hole of the structure, and in said anchor-expanding position, said anchor is locked inside the hole of the structure;

means for normally urging said second chock into the anchor-expanding position;

a handle adapted for moving said second chock from the anchor-expanding position to the anchor-contracting position;

a chock cable interconnecting said handle and said second chock;

a cable-positioning ferrule defining respective spaced-apart opening receiving said load cable and said chock cable; and a chock-release column bearing against at least one of said first and second chocks, and comprising an enlarged head adapted for locating outside of the hole, said enlarged head defining a striking surface adapted for receiving a sudden force and transferring the force through said chock-release column to said first or second chocks, such that said second chock is movable from the anchor-expanding position to the anchor-contracting position to thereby dislodge said anchor from the hole of the structure.

8. An expansible anchor according to claim 7, wherein said handle comprises a rocker assembly allowing kink-controlling movement of said chock cable relative to said load cable.

9. An expansible anchor according to claim 7, wherein said chock-release column comprises a cable guide defining a contoured opening receiving said load cable and said chock cable.

10. an expansible anchor according to claim 7, wherein said first chock comprises a bearing shoulder against which said chock-release column is forced.

11. An expansible anchor adapted for inserting into a hole formed with a structure, said anchor comprising:

a load cable;

a first chock attached to an end of said load cable;

a second chock adjacent to said first chock and adapted for movement between an anchor-contracting position and an anchor-expanding position, whereby in said anchor-contracting position, said anchor is readily inserted into and removed from the hole of the structure, and in said anchor-expanding position, said anchor is locked inside the hole of the structure;

a handle carried by said load cable and adapted for moving said second chock from the anchor-expanding position to the anchor-contracting position;

a chock cable interconnecting said handle and said second chock;

a rocker assembly allowing kink-controlling movement of said chock cable relative to said load cable; and a chock-release column bearing against at least one of said first and second chocks and comprising an enlarged head adapted for locating outside of the hole, said enlarged head defining a striking surface adapted for receiving a sudden force and transferring the force through said chock-release column to said first or second chocks, such that said second chock is movable from the anchor-expanding position to the anchor-contracting position to thereby dislodge said anchor from the hole of the structure.

12. An expansible anchor adapted for inserting into a hole formed with a structure, said anchor comprising:

a load cable;

a first chock attached to an end of said load cable;

a second chock adjacent to said first chock and adapted for movement between an anchor-contracting position and an anchor-expanding position, whereby in said anchor-contracting position, said anchor is readily inserted into and removed from the hole of the structure, and in said anchor-expanding position, said anchor is locked inside the hole of the structure;

a handle carried by said load cable and adapted for moving said second chock from the anchor-expanding position to the anchor-contracting position;

a chock cable interconnecting said handle and said second chock;

a cable-positioning ferrule defining respective spaced-apart openings for receiving said load cable and said chock cable; and a chock-release column bearing against at least one of said first and second chocks and comprising an enlarged head adapted for locating outside of the hole, said enlarged head defining a striking surface adapted for receiving a sudden force and transferring the force through said chock-release column to said first or second chocks, such that said second chock is movable from the anchor-expanding position to the anchor-contracting position to thereby dislodge said anchor from the hole of the structure.

13. An expansible anchor adapted for inserting into a hole with a structure, said anchor comprising:

a load cable;

a first chock attached to an end of said load cable;

a second chock adjacent to said first chock and adapted for sliding linear movement between an anchor-contracting position and an anchor-expanding position, whereby in said anchor-contracting position, said anchor is readily inserted into and removed from the hole of the structure, and in said anchor-expanding position, said anchor is locked inside the hole of the structure;

means for normally urging said second chock into the anchor-expanding position;

a handle adapted for moving said second chock from the anchor-expanding position to the anchor-contracting position;

a chock cable interconnecting said handle and said second chock;

a rocker assembly allowing kink-controlling movement of said chock cable relative to said load cable; and a chock-release column bearing against at least one of said first and second chocks, and comprising an enlarged head adapted for locating outside of the hole, said enlarged head defining a striking surface adapted for receiving a sudden force and transferring the force through said chock-release column to said first or second chocks, such that said second chock is movable from the anchor-expanding position to the anchor-contracting position to thereby dislodge said anchor from the hole of the structure.

* * * * *